United States Patent
Kato et al.

(10) Patent No.: US 7,343,050 B2
(45) Date of Patent: Mar. 11, 2008

(54) IMAGE SYNTHESIZING APPARATUS, IMAGE SYNTHESIZING METHOD AND A COMPUTER READABLE RECORDING MEDIUM HAVING RECORDED A PROGRAM

(75) Inventors: Yoshiyuki Kato, Higashiyamato (JP); Kaoru Yoshida, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 887 days.

(21) Appl. No.: 10/800,100

(22) Filed: Mar. 12, 2004

(65) Prior Publication Data

US 2004/0179749 A1    Sep. 16, 2004

(30) Foreign Application Priority Data

Mar. 14, 2003  (JP)  ............................. 2003-069695
Jan. 9, 2004   (JP)  ............................. 2004-003781

(51) Int. Cl.
    *G06K 9/36*      (2006.01)
(52) U.S. Cl. ............... 382/284; 382/190; 382/294; 382/298; 358/538; 358/540; 358/450
(58) Field of Classification Search ............... 382/190, 382/235, 282, 284, 294, 298; 358/538, 540, 358/450, 453
    See application file for complete search history.

(56) References Cited

U.S. PATENT DOCUMENTS

| | | | | |
|---|---|---|---|---|
| 6,003,070 A | * | 12/1999 | Frantz | ......................... 709/206 |
| 6,256,666 B1 | * | 7/2001 | Singhal | ...................... 709/217 |
| 6,366,622 B1 | * | 4/2002 | Brown et al. | ............... 375/322 |
| 6,745,024 B1 | * | 6/2004 | DeJaco et al. | ............... 709/206 |

FOREIGN PATENT DOCUMENTS

| | | |
|---|---|---|
| JP | 2002-290831 A | 10/2002 |
| JP | 2003-204531 A | 7/2003 |
| JP | 2003-296713 A | 10/2003 |

* cited by examiner

*Primary Examiner*—Yosef Kassa
(74) *Attorney, Agent, or Firm*—Frishauf, Holtz, Goodman & Chick, P.C.

(57) ABSTRACT

Disclosed is an image synthesizing apparatus which extracts plural images of different magnification ratios from a single piece of image data and combines those images to provide a moving image equivalent to a moving image zoomed up in moving image pickup. In record mode, an image acquired by a CCD is subjected to color processing and is then sent to an image memory. At the same time, a through image is displayed on a display section. If it is a zoomed moving image mode, when a shutter is pressed to pick up an image, plural images zoomed up in plural levels are created based on image data stored then in the image memory as an original image. A zoomed moving image equivalent to a zoomed moving image is obtained in moving image pickup.

17 Claims, 10 Drawing Sheets

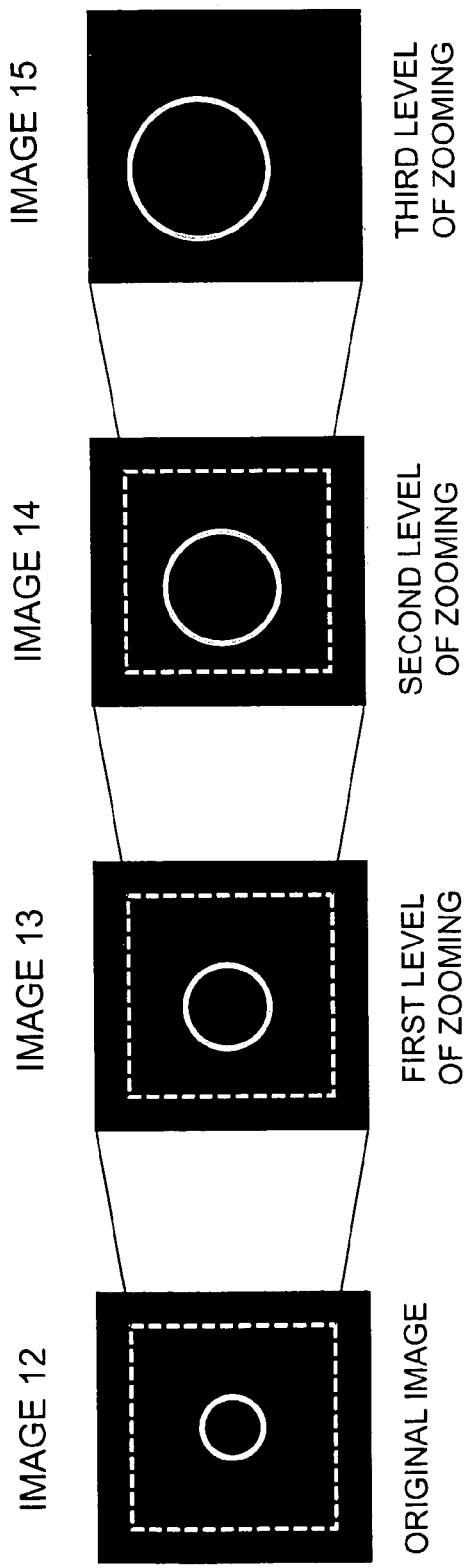

| UPPER LEFT COORDINATE | IMAGE SIZE |
|---|---|
| (0,0) | 1280 × 960 |
| (4,3) | 1272 × 954 |
| (8,6) | 1264 × 948 |
| (12,9) | 1256 × 942 |
| (16,12) | 1248 × 936 |
| (20,15) | 1240 × 930 |
| ⋮ | ⋮ |
| ⋮ | ⋮ |
| (320,240) | 640 × 480 |

RECTANGLE ZOOMING → 1280 × 960
RECTANGLE ZOOMING → 1280 × 960
RECTANGLE ZOOMING → 1280 × 960
RECTANGLE ZOOMING → 1280 × 960
RECTANGLE ZOOMING → 1280 × 960
RECTANGLE ZOOMING → 1280 × 960
RECTANGLE ZOOMING → 1280 × 960

IMAGE SYNTHESIS → 1280 × 960

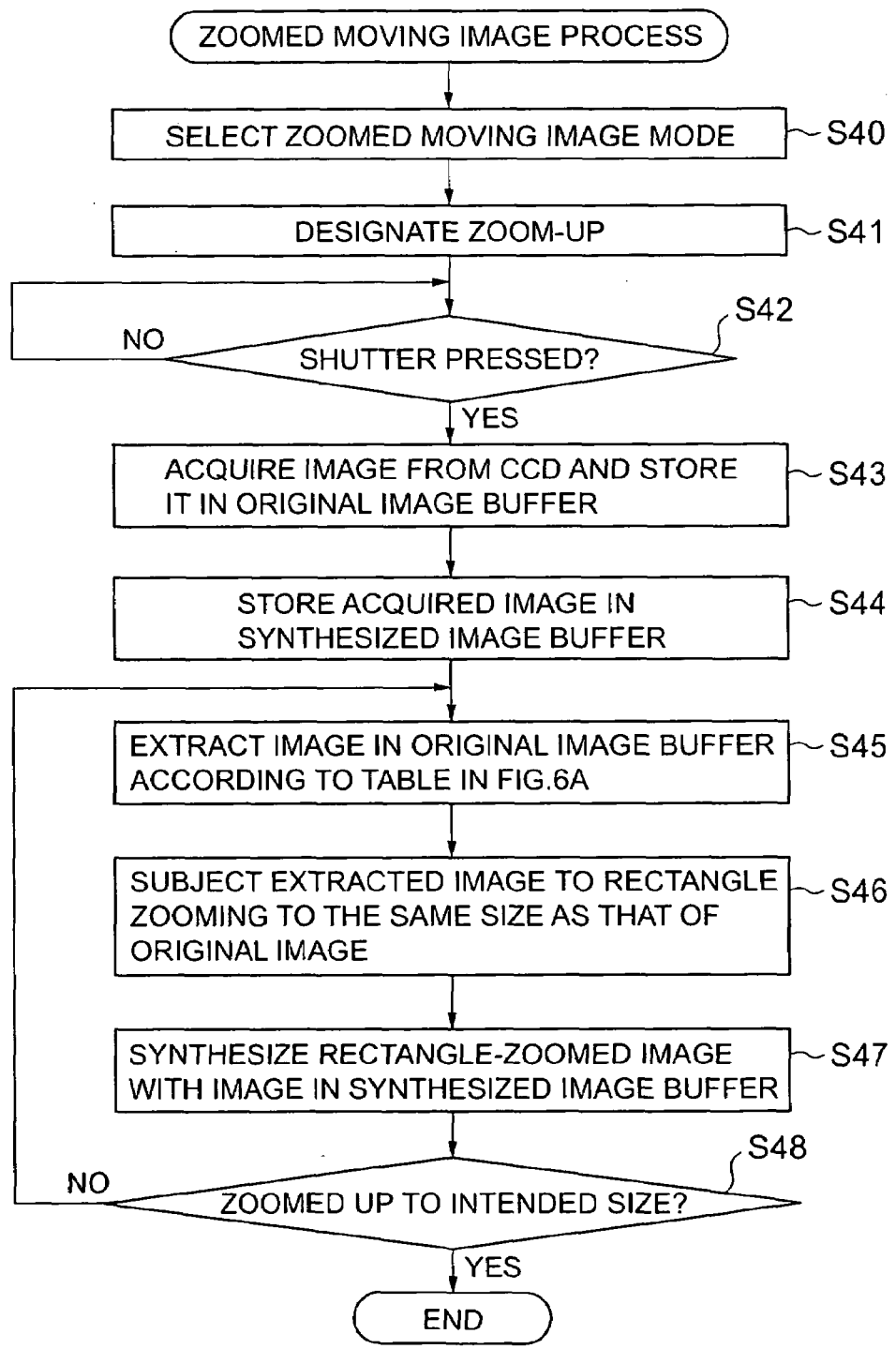

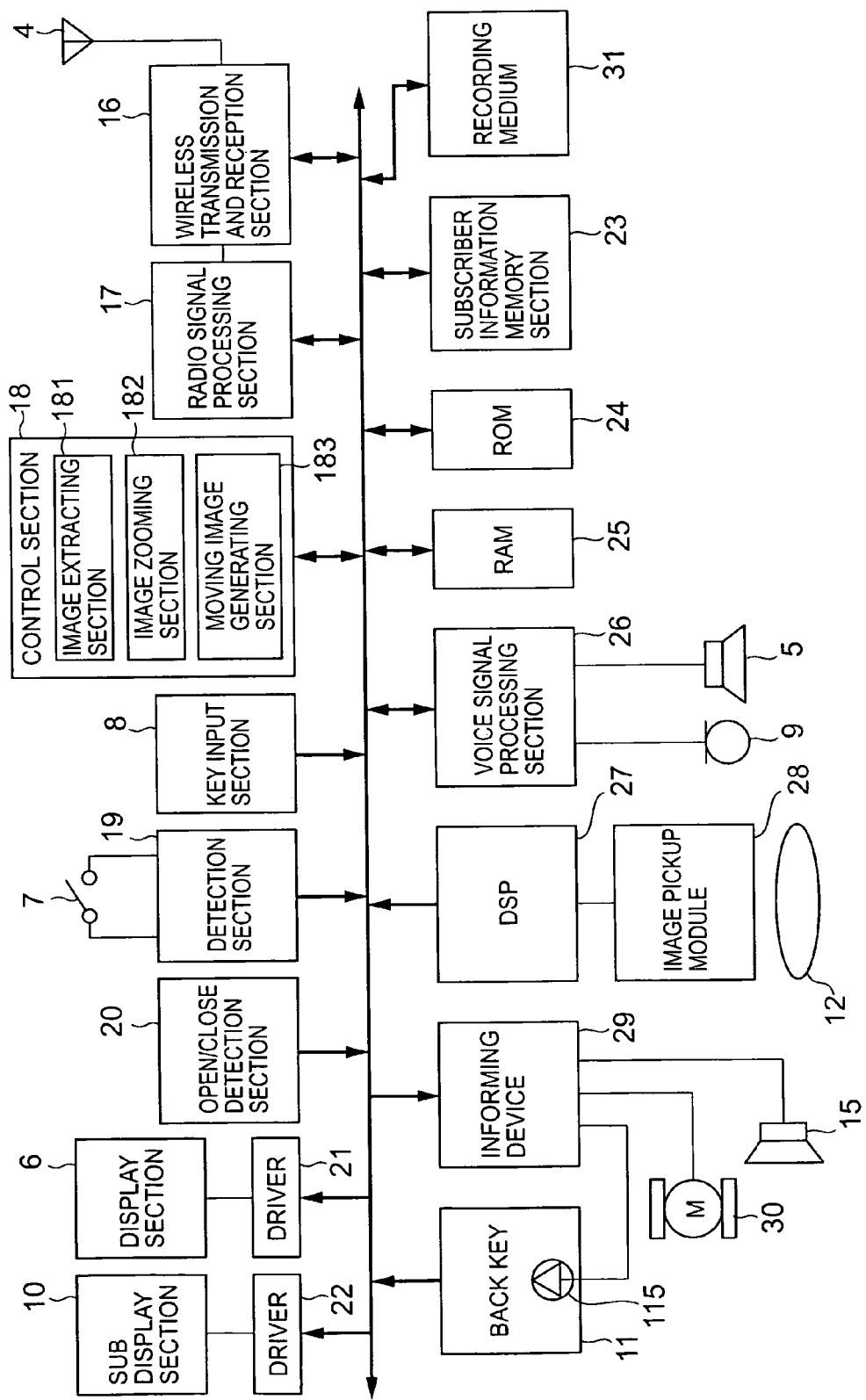

IMAGE SYNTHESIZING APPARATUS, IMAGE SYNTHESIZING METHOD AND A COMPUTER READABLE RECORDING MEDIUM HAVING RECORDED A PROGRAM

BACKGROUND OF THE INVENTION

The present invention relates to an image synthesizing apparatus, image synthesizing method and a computer readable recording medium having recorded a program which can obtain a simple moving image by generating a plurality of still images from a single still image and combining the still images.

Digital cameras are well known as one type of an electronic imaging apparatus. With the technology of increasing the number of pixels of digital cameras, recent digital cameras can provide images with the quality no less than the quality of silver-gelatin (analog) cameras. A digital camera has functions such as a record mode to pick up and save images and a reproduction mode to reproduce saved images.

Conventional digital cameras have various imaging modes, such as a panoramic imaging mode to link plural picked-up still images to create a panoramic image and a moving image pickup mode to link plural still images in a format called "motion JPEG" to create a moving image. In imaging a subject, the digital cameras can pick up an image zoomed by an optical zoom function and an electronic zoom function. Some techniques of producing a moving image from still images create a moving image from a plurality of still images whose focus points are changed so that the moving image has a video effect (see Japanese Patent Application KOKAI Publication No. 2002-290831).

The conventional digital cameras cannot however provide a moving image easily unless the cameras are equipped with a moving image pickup mode. In addition, the conventional digital cameras cannot provide a moving image having such a zoom effect that the image is picked up in moving image pickup mode.

SUMMARY OF THE INVENTION

An image synthesizing apparatus according to the invention comprises an image extracting section which extracts plural images of different sizes from a single image as an original image; an image zooming section which zooms up the plural images of different sizes extracted by the image extracting section to a same size as a size of the original image; and a moving image generating section which synthesizes the plural images zoomed up by the image zooming section to generate a moving image.

BRIEF DESCRIPTION OF THE DRAWINGS

FIG. 2 is a diagram showing the principle of zoom synthesis;

FIG. 7 is a flowchart illustrating a zoomed moving image process;

FIG. 9 is a block diagram of the portable telephone; and

DETAILED DESCRIPTION OF THE PREFERRED EMBODIMENTS

First Embodiment

One embodiment of the present invention where a digital camera 100 is used as an image synthesizing apparatus is described below with reference to the accompanying drawings.

Figure 1:
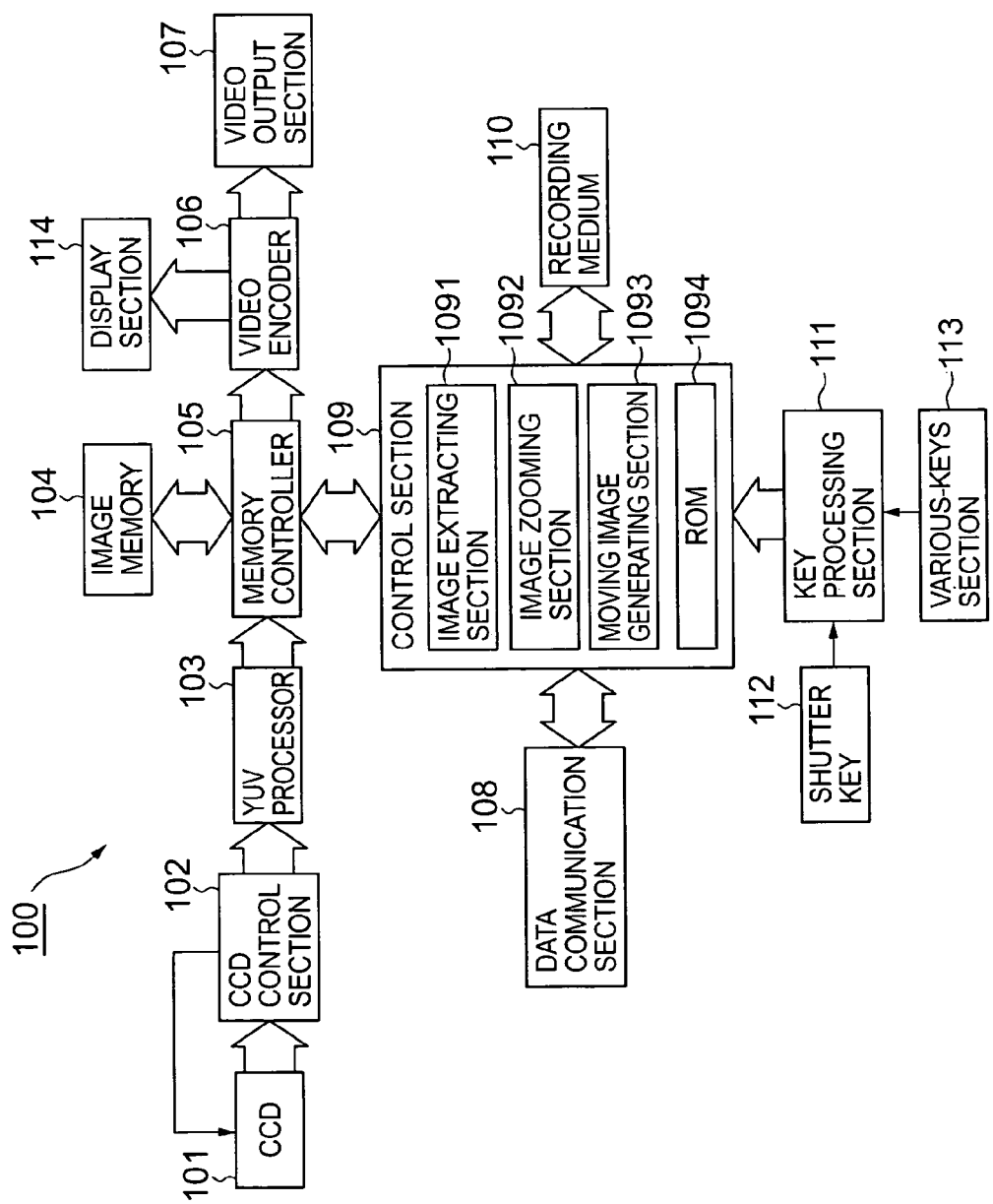
FIG. 1 is a block diagram of a digital camera according to first and second embodiments of present the invention.

FIG. 1 shows a block diagram of the digital camera 100. The digital camera 100 is controlled by a control program stored in a ROM (Read Only Memory) 1094 of a control section 109. The control section 109 also functions as an image extracting section 1091, an image zooming section 1092 and a moving image generating section 1093. A record mode and a reproduction mode are the basic operation modes of the digital camera 100.

In record mode, image data acquired by a CCD (Charge Coupled Device) 101 (imaging section) located at the back of a lens is converted to digital data by an A/D converter (not shown) provided together with a CCD control section 102 which controls the CCD 101, and is sent to a YUV processor 103. The YUV processor 103 performs color processing so that a digital luminance and color-difference multiplex signal (YUV data) are transferred to an image memory 104 via a memory controller 105. The image memory 104 is comprised of a memory, such as a RAM (Random Access Memory).

To achieve through image display, the YUV data is also sent via the memory controller 105 to a video encoder 106 which periodically reads the YUV data, generates a video signal based on the YUV data and sends the video signal to a video output section 107 and a display section 114 at the same time. The display section 114, which is constituted by a liquid crystal display, displays an image based on image information currently acquired from the CCD 101.

With an image currently displayed on the display section 114, when a shutter key 112 is pressed at a timing to record and save the image, a key processing section 111 processes the input from the shutter key 112 and the control section 109 transfers the YUV data currently acquired from the CCD 101 to the image memory 104 via the memory controller 105. The control section 109 then blocks the path from the CCD 101 to the image memory 104 immediately, causing transition to a recording and saving state. In the recording and saving state, the control section 109 compresses the YUV data written in the image memory 104 and writes the compressed data in a recording medium 110 (recording section). The recording medium 110 is a flash memory or so which is a non-volatile memory. The non-volatile memory may be of a detachable type. The digital camera 100 may be equipped with both a detachable type memory and a built-in type memory. As compression of the YUV data and writing of the compressed data into the flash memory are completed, the control section 109 activates the path from the CCD 101 to the image memory 104 again.

In reproduction mode, the control section 109 blocks the path from the CCD 101 to the image memory 104. As a various-keys section 113 is manipulated to select an image from those recorded, the key processing section 111 processes the input event and the control section 109 reads the compressed data from the flash memory, expands the data and develops the YUV data into the image memory 104. Then, the video encoder 106 generates a video signal based on the YUV data and sends the video signal to the video output section 107 and also to the display section 114 for the display purpose.

A data communication section 108 (data transmission and reception section) transmits an image picked up and recorded or an image already stored in the recording medium 110 to an external device, e.g., a personal computer or so, or receives an image from the external device. Communication may be carried out wirelessly or by a cable (USB or so).

When the manipulation of the various-keys section 113 has set the mode to a "zoomed moving image mode" to acquire an image equivalent to a zoomed image obtained in moving image pickup, first, plural images zoomed up in plural levels are generated based on image data at the instant of depression of the shutter key 112 stored in the image memory 104 as original image. Those images are linked to generate a zoomed moving image equivalent to a zoomed image obtained in moving image pickup. The linked moving image is output via the video encoder 106 to the video output section 107 and the display section 114 and is recorded in the recording medium 110. The original image may be not only an image acquired from the CCD 101 but also an image already recorded in the recording medium 110 or an image sent through the data communication section 108 and a zoomed moving image can also be generated with respect to the latter two types of images. In case of generating a zoomed moving image from the image already recorded in the recording medium 110, for example, the "zoomed moving image mode" is selected in reproduction mode and a desired image should be selected as the original image from recorded images.

FIG. 2 illustrates the principle of zoom synthesis. An image 12 is an original image acquired from the CCD 101. An image 13 is a first-level zoom-up image which is a part of the original image zoomed up. An image 14 is a second-level zoom-up image which is the first-level zoom-up image zoomed up. An image 15 is a third-level zoom-up image which is the second-level zoom-up image zoomed up. Those images are synthesized.

Figure 3A:
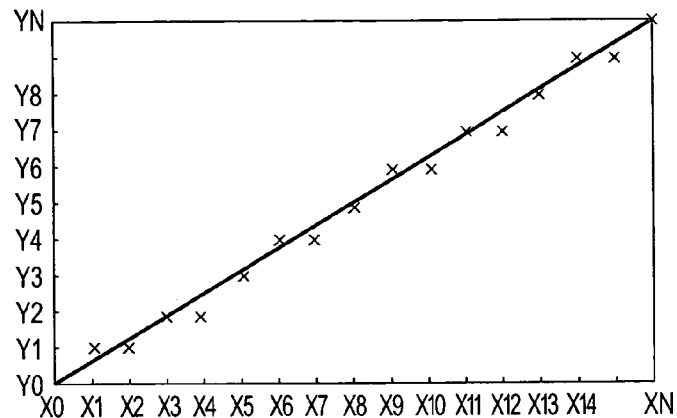
FIG. 3A is a coordinate diagram showing a line segment generating algorithm.

The following discusses a rectangle zooming algorithm required in zoom synthesis to acquire a smooth zoom ratio, referring to FIGS. 3A to 5B. FIGS. 3A and 3B show a line segment generating algorithm which is the basis of the rectangle zooming algorithm needed in zoom synthesis. The line segment generating algorithm determines at which coordinates dots constituting a line segment to be drawn from (X0, Y0) to (XN, YN) should be placed.

As shown in FIG. 3A, an ideal straight line is a line simply connecting (X0, Y0) and (XN, YN). Because coordinates where dots can be placed do not exist infinitely in a digital image, however, dots are laid out on coordinates closest to the ideal line. As the start point is (X0, Y0), at which there exist coordinates originally, the Y coordinate with respect to X0 becomes Y0. Every time X increases by 1 thereafter, Y increases by (YN−Y0)/(XN−X0) in the ideal line. Although the Y coordinate with respect to X1 is ideally Y0+(YN−Y0)/(XN−X0), the closest coordinate, Y1, is selected as indicated by a mark "X" in FIG. 3A. FIG. 3A shows that the coordinates are being determined like X0=0, XN=16, Y0=0 and YN=10. An increment of Y when X increases by 1 becomes (YN−Y0)/(XN−X0)=10/16=0.625. An error (error of Y) from the Y coordinate at (X0, Y0) is 0. The error of Y at X1 is 0+0.625=0.625. The Y coordinate is determined by checking whether the error of Y is greater than 0.5 or not. Because the error of Y is greater than 0.5 in this case, the Y coordinate is incremented by 1 and becomes 1(Y1). As the Y coordinate is incremented by 1, the error of Y becomes 0.625−1=−0.375 by subtracting 1 from the then error of Y. The error of Y at X2 becomes −0.375−0.625=0.25. As the error of Y is less than 0.5, the Y coordinate remains 1(Y1). The error of Y remains unchanged. Likewise, as the error of Y is incremented by 0.625 and it is determined whether the error of Y is greater than 0.5 or not, a line (marks X) in FIG. 3A is acquired.

Figure 3B:
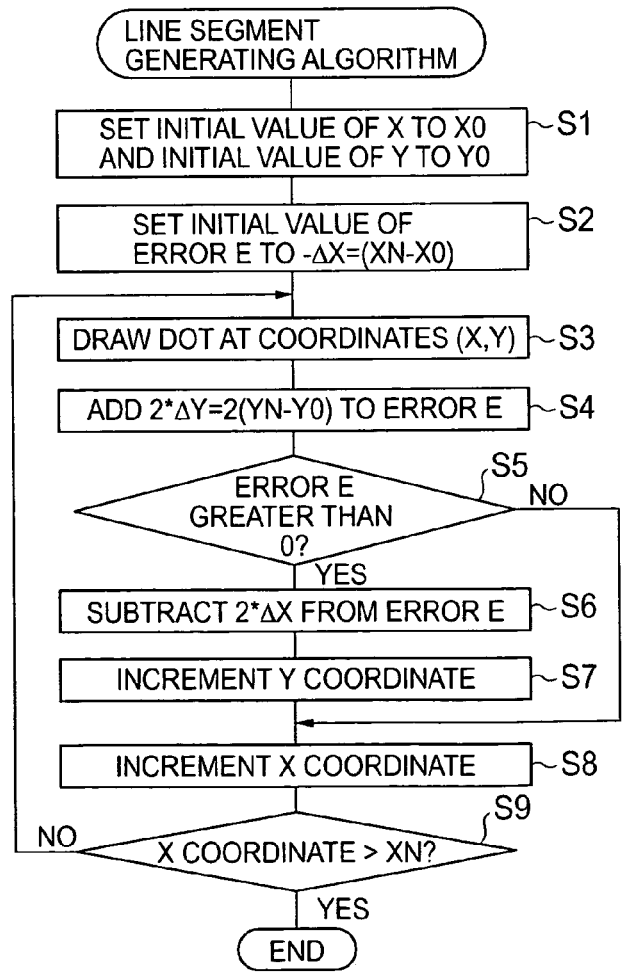
FIG. 3B is a flowchart illustrating the line segment generating algorithm.

The flowchart in FIG. 3B is realized by an arithmetic operation on integers alone in order to make the above-described operation more easily processable by a computer. In the foregoing description, the initial value of the error of Y is taken as 0 and it is determined whether the error is greater than 0.5 or not when Y is incremented. In the flowchart, however, the initial value of the error is taken as −0.5 and it is determined whether the error is greater than 0 or not when Y is incremented. Given that $\Delta Y = YN-Y0$, $\Delta X = XN-X0$, the initial value of the error is −0.5 and the error is determined by checking $E_{i+1} = E_i + \Delta Y / \Delta X > 0$. ($E_{i+1} = E_i - 1$ if the condition is met). Next, the determination of the error is carried out with the error multiplied by $2\Delta X$. Then, the initial value of the error becomes $-\Delta X$ and the error is determined by checking $E_{i+1} * 2\Delta X = E_i * 2\Delta X + 2\Delta Y > 0$. ($E_{i+1} = E_i - 2\Delta X$ if the condition is met).

The operation of the above algorithm is described referring to the flowchart in FIG. 3B. First, the initial coordinate of X is set to X0 and the initial coordinate of Y is set to Y0 (step S1). Next, the initial value of the error E is set to $-\Delta X = -(XN-X0)$ (step S2). A dot is drawn at the coordinates (X, Y) (step S3), and the error E is incremented by $2\Delta Y = 2(YN-Y0)$ (step S4). Then, it is determined whether the error E is greater than 0 or not (step S5). If the error E is equal to less than 0, the flow goes to step S8. If the error E is greater than 0, $2\Delta X$ is subtracted from the error E (step S6) and the Y coordinate is incremented (step S7). Next, the X coordinate is incremented (step S8). The above-described process is repeated until the X coordinate exceeds XN (step S9).

Figure 4A:
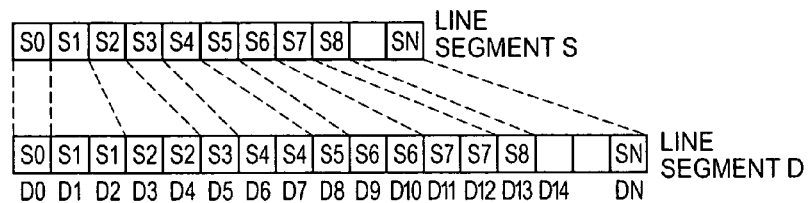
FIG. 4A is a structural diagram showing a line segment expanding algorithm.
Figure 4B:
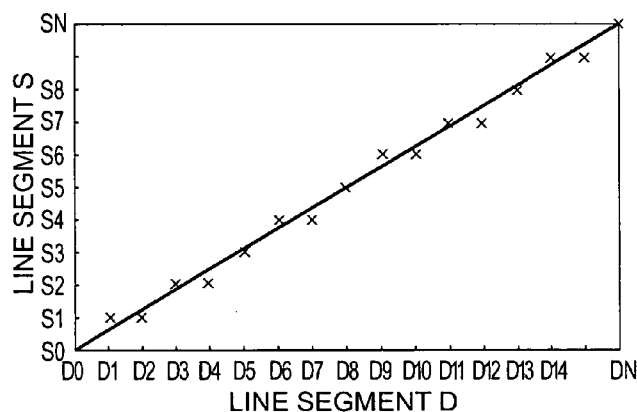
FIG. 4B is a coordinate diagram showing the line segment expanding generating algorithm.
Figure 4C:
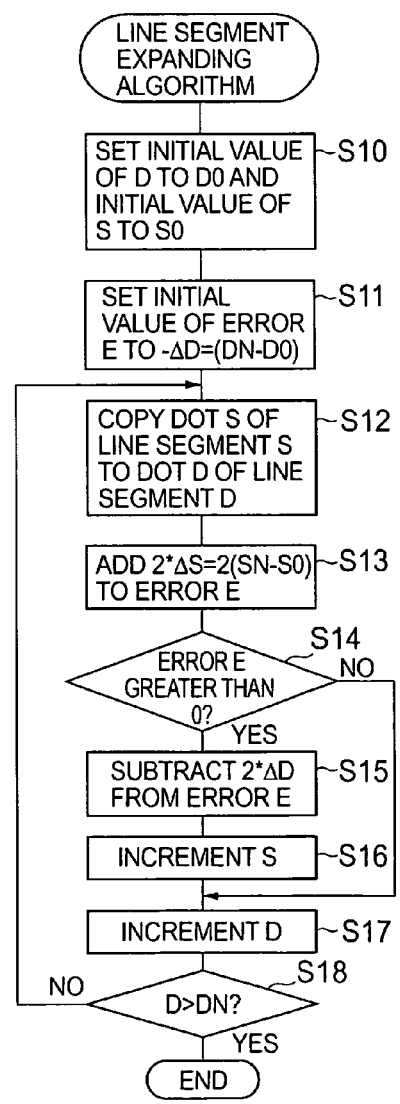
FIG. 4C is a flowchart illustrating the line segment expanding algorithm.

FIGS. 4A to 4C shows a line segment expanding algorithm which can expand a line segment using the line segment generating algorithm shown in FIGS. 3A and 3B. As shown in FIG. 4A, a line segment formed by dots S0 to SN is expanded to a line segment D formed by dots D0 to DN. The principle of the expansion is to replace the X coordinate in FIG. 3A with a target line segment D for expansion and replace the Y coordinate to an original line segment S for expansion (FIG. 4B).

The line segment expanding algorithm is described referring to the flowchart in FIG. 4C. First, the initial pixel of the target line segment D for expansion is set to D0 and the initial pixel of the original line segment S for expansion is set to S0 (step S10). The initial value of the error E of the line segment S is set to $-\Delta D = (DN-D0)$ (step S11). A dot S of the line segment S (initial state is $S0_0$) is copied to a dot D of the line segment D (initial state is $D0_0$) (step S12). $2\Delta S = 2(SN-S0)$ is added to the error E (step S13), it is then determined whether the error E is greater than 0 or not (step S14). If the error E is equal to or smaller than 0, the flow goes to step S17. If the error E is greater than 0, $2\Delta D$ is subtracted from the error E (step S15) and the dot of the original line segment S for expansion is incremented (the next dot is selected) at the same time (step S16). Next, the dot of the target line segment D for expansion is incremented (the next dot is selected) (step S17). The above-described process is repeated until the dot D exceeds DN and the process for all the dots is completed (step S18).

Figure 5A:
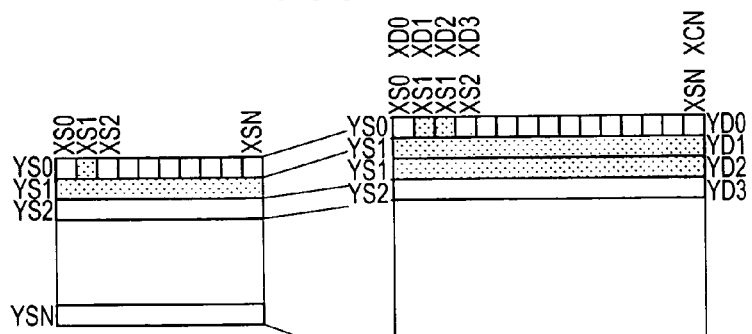
FIG. 5A is a structural diagram showing a rectangle zooming algorithm.
Figure 5B:
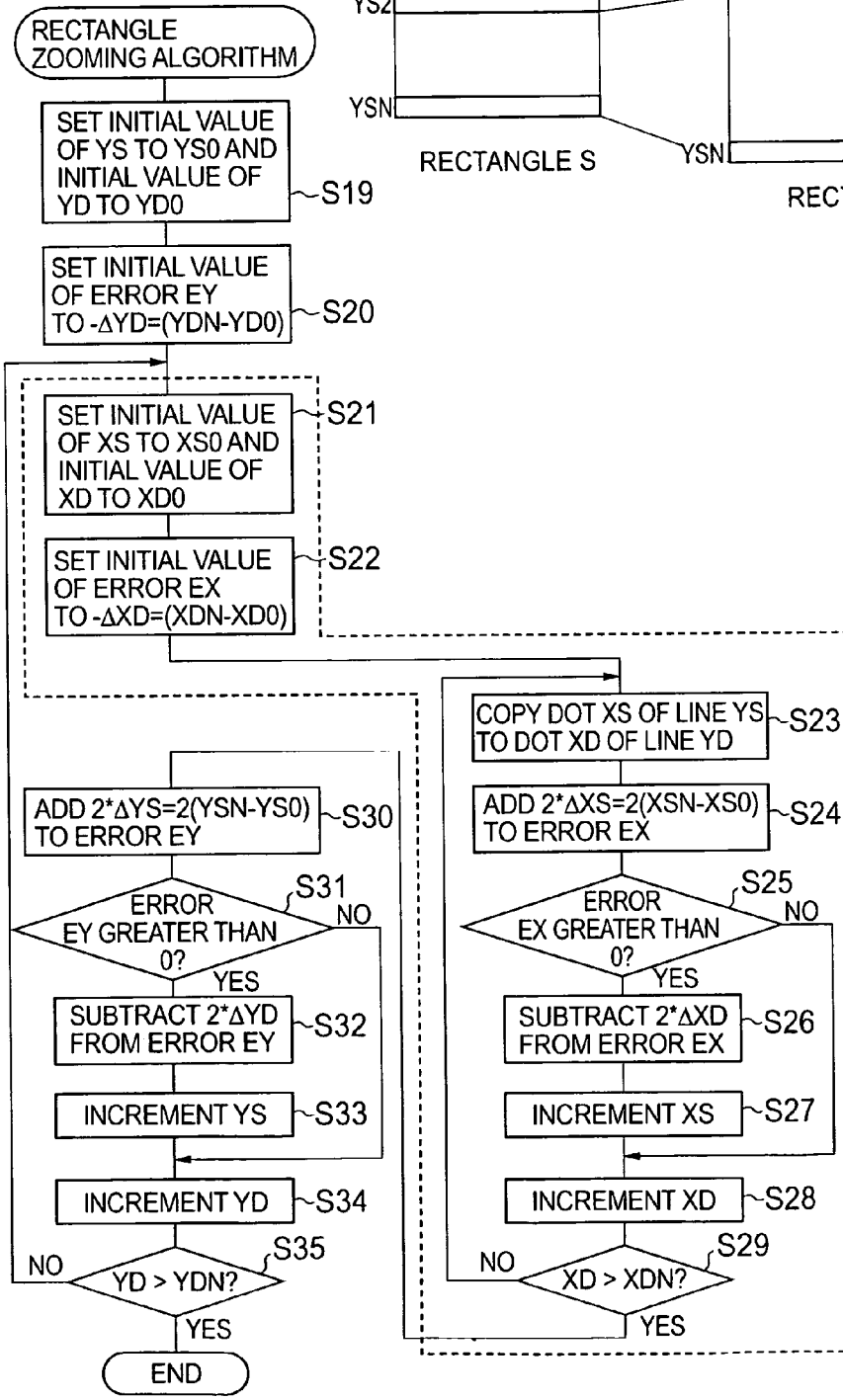
FIG. 5B is a flowchart illustrating the rectangle zooming algorithm.

FIGS. 5A and 5B show a rectangle zooming algorithm which can zoom a rectangle a line segment is two-dimensionally enlarged using the line segment expanding algorithm shown in FIGS. 4A to 4C. As shown in FIG. 5A, a rectangle S comprised of horizontal segments XS0 to XSN and vertical segments YS0 to YSN is zoomed up to a rectangle D comprised of horizontal segments XD0 to XDN and vertical segments YD0 to YDN.

In the vertical direction, the line segment expanding algorithm shown in FIGS. 4A to 4C is used to extend the lines YS0 to YSN to the lines YD0 to YDN. The line YS0 is copied to the line YD0 and the line YS1 is copied to the lines YD1 and YD2. Once a line is determined, the dots in the line can be expanded by using the line segment expanding algorithm shown in FIGS. 4A to 4C.

The rectangle zooming algorithm illustrated above is described referring to the flowchart in FIG. 5B. The part (step S19, S20 and S30 to S35) other than the meshed part is a process of extending a line and the meshed part (step S21 to S29) is a process of expanding dots in a line. First, the initial line for the rectangle S is set to YS0 and the initial line for the rectangle D is set to YD0 (step S19) in order to extend the line. The initial value of the error EY for extending the line is set to −ΔYD=(YDN−YD0) (step S20). Then, dots in the line are expanded (meshed part). As the meshed part (step S21 to S29) is equivalent to S10 to S18 in the flowchart that has been discussed referring to FIG. 4C, its description is not repeated. Next, 2ΔYS=2(YSN−YS0) is added to the error EY (step S30). It is then determined whether the error EY is greater than 0 or not (step S31). If the error EY is equal to or smaller than 0, the flow goes to step S34. If the error EY is greater than 0, 2ΔYD is subtracted from the error EY (step S32) and the original line YS for transfer is incremented (the next line is selected) at the same time (step S33). Next, the target line YD for transfer is incremented (the next line is selected) (step S34). The above-described process is repeated until the line YD exceeds YDN and the process for all the lines is completed.

Using this rectangle zooming algorithm, a rectangle of any given size can be zoomed to a rectangle of any size so that a plurality of images whose zoom ratios finely change with respect to the original image can be prepared. Because zooming a rectangle can be accomplished merely by a simple arithmetic operation on integers, a zoomed moving image can be acquired in a short period of time without burdening the control section 109.

Figures 6A, 6B:
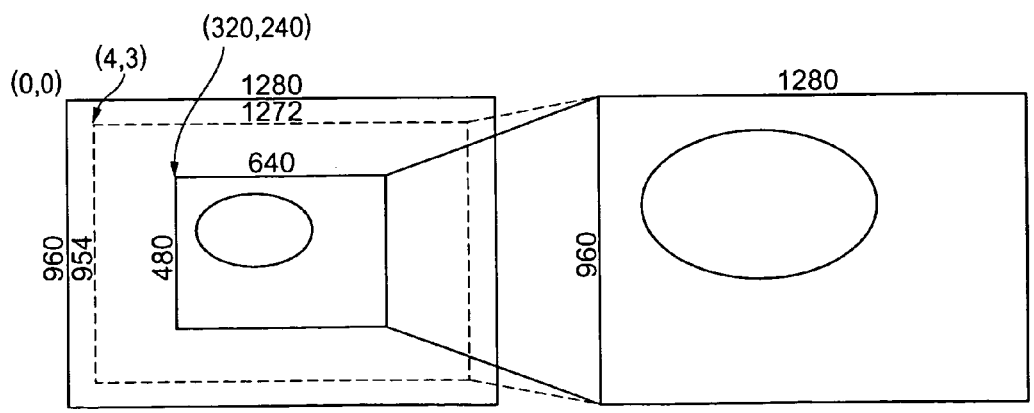
FIG. 6A is a diagram showing an extracted image information table.
FIG. 6B is a diagram showing an extracted image.

FIG. 6A shows an extracted image information table for extracting images of plural sizes. The information table is stored in the ROM 109A (information memory section). The information table has a collection of the upper left coordinates of the original image from which images are extracted in case of continuously changing the zoom ratio and image sizes. In FIG. 6A, the size of the original image is 1280×960. The upper left coordinate of an image to be extracted for the first level of zooming of the original image is (4, 3) and the image size is 1272×954. The upper left coordinate of an image to be extracted at the time of executing the second level of zooming is (8, 6). Likewise, the upper left coordinates and image sizes with respect to plural levels of zooming are included in the table. Each extracted image is enlarged to an image of 1280×960 by the rectangle zooming algorithm shown in FIGS. 5A and 5B.

FIG. 6B shows an extracted image subjected to rectangle zooming. FIG. 6B shows the case where the extracted image whose upper left coordinate is (320, 240) and whose size is 640×480 is zoomed to an image with a size of 1280×960.

Although plural zoomed images are acquired by zooming up the center of the image as shown in FIG. 6B, zoomed images can be acquired while shifting the zoom-up center at a given interval in an arbitrary direction from the center of the image. Further, the initial zoom-up position should not necessarily be the center of an image but the zoom-up center may be designated to an arbitrary position such as the left corner of the image by manipulating the various-keys section 113. The zoom-up range may be designated to an arbitrary area. This design can ensure a zoom-up intended by a user, so that zoomed images of multifarious preferences can be created.

While plural zoomed images are generated from an original image, zoomed images may be created from an image extracted and subjected to rectangle zooming previously. In this case, the upper left coordinate of the extracted image and the image size can be set constant, thus eliminating the need for the extracted image information table as shown in FIG. 6A. Further, the zoom-up levels may be made designatable by a user as needed. Furthermore, a plurality of extracted image information tables as shown in FIG. 6A may be provided and a designated information table may be used. This design can generate zoomed moving images of multifarious preferences.

Although the sizes of extracted images in the extracted image information table are set finely to acquire smooth zoomed moving images, the sizes of extracted images may be set roughly in which case quite new zoomed moving images that cannot be acquired by the optical zoom in moving image pickup can be provided.

Further, images extracted based on the extracted image information table may be synthesized in a random order in which case playful zoomed moving images that cannot be imaged in the ordinary moving image pickup mode can be acquired.

FIG. 7 presents a flowchart illustrating a zoomed moving image process. The zoomed moving image mode is selected by manipulating the various-keys section 113 (step S40) and the intended zoom-up size, such as ×5, ×10 or ×20, is designated first (step S41). It is determined whether the shutter key 112 has been pressed in zoomed moving image mode or not (step S42). When the shutter key 112 has been pressed to take a shot, first, the image acquired from the CCD 101 is stored in a part of the image memory 104 used as an original image buffer (step S43). When a shot is taken during the zoomed moving image process, the image acquired from the CCD 101 is always stored in the original image buffer. A plurality of zoomed images are generated based on those images as original images. At the same time, the acquired image is stored in a part of the image memory 104 used as a synthesized image buffer (setting of the initial image) (step S44). The synthesized image of the images of up to the previous zoom ratios is stored in the synthesized image buffer during the zoomed moving image process and every time an image of a new zoom ratio is generated, the image is synthesized with the image in the synthesized image buffer. When setting of the initial image is finished in the synthesized image buffer, an image is extracted from the image in the synthesized image buffer according to the table explained referring to FIG. 6A (step S45). The extracted image is zoomed to the same size as the size of the original image by executing the rectangle zooming process (step S46). The image subjected to rectangle zooming is synthesized with the image in the synthesized image buffer and the resultant image is stored again in the synthesized image buffer (step S47). The process starting at step S46 is repeated until zoom-up to the intended size is completed (step S48). When zoom-up to the intended size is completed, the image is saved as a zoomed moving image in the recording medium 110.

According to the invention, as described above, a plurality of rectangles whose sizes continuously change are extracted from a single picked-up original image, and the extracted rectangles are zoomed to the same size as the size of the original image and are synthesized to acquire a moving image, so that a moving image equivalent to a moving image picked up by using the optical zoom or electronic zoom in moving image pickup can be acquired easily. This embodiment can permit a digital camera which does not have a moving image pickup function or a zoom function to acquire a zoomed moving image. Further, a single shot should be taken normally so that a zoomed moving image is obtained without in less time than is need for the ordinary moving image pickup.

Second Embodiment

In the first embodiment, the zoomed moving image process is executed using an image acquired upon depression of the shutter key 112 as an original image. In the second embodiment to be illustrated below, however, the zoomed moving image process is executed using a through image before depression of the shutter key 112 as an original image. As the operation of the digital camera 100, the extracted image information table and the rectangle zooming algorithm are the same as those of the first embodiment already discussed, their descriptions are not repeated.

In the second embodiment, first, the intended zoom-up size, such as ×5, ×10 or ×20, is designated by manipulating the various-keys section 113. When the mode is the zoomed moving image mode, the zoomed moving image process is executed while image data acquired from the CCD 101 is displayed on the display section 114. That is, a process similar to the zoomed moving image process which is executed at the stage of picking up and storing an image after the operation of the shutter key 112 in the first embodiment is carried out in the image pickup preparation state before the operation of the shutter key 112. As a result, the image subjected to the zoomed moving image process is output to the video output section 107 and to the display section 114 simultaneously. Accordingly, a zoomed moving image is always displayed on the display section 114 in the image pickup preparation state and a user depresses the shutter key 112 while viewing an image to be picked up, which has been subjected to the zoomed moving image process, on the display section 114. When the shutter key 112 is pressed, the zoomed moving image then displayed on the display section 114 is saved in the recording medium 110. Of course, at this time, the synthesizing process may be carried out using the image acquired by depression of the shutter key 112 as the original image as per the first embodiment.

As the zoomed moving image process is performed and a zoomed moving image is displayed on the display section 114 at the stage of displaying a through image before depression of the shutter key 112, the user can pick up an image while viewing a zoomed moving image. This can allow the user to select whether or not to take a shot at the time of viewing a zoomed moving image, so that the user can avoid doing wasteful image pickup and recording and can acquire an intended image easily.

Third Embodiment

While the foregoing descriptions of the first and second embodiments have been given of the case where the digital camera 100 is used as an image synthesizing apparatus, the third embodiment to be discussed below referring to the FIGS. 8A to 10 uses a portable telephone as an image synthesizing apparatus. As the extracted image information table and the rectangle zooming algorithm are the same as those of the first embodiment already discussed, their descriptions are not repeated.

Figure 8A:
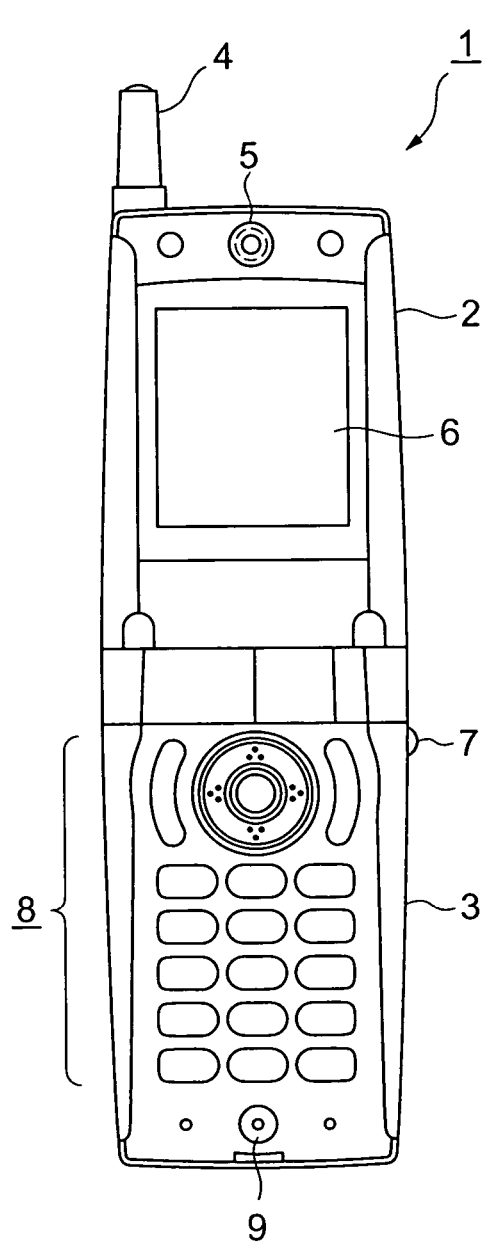
FIG. 8 is an outline view of a portable telephone.
Figure 8B:
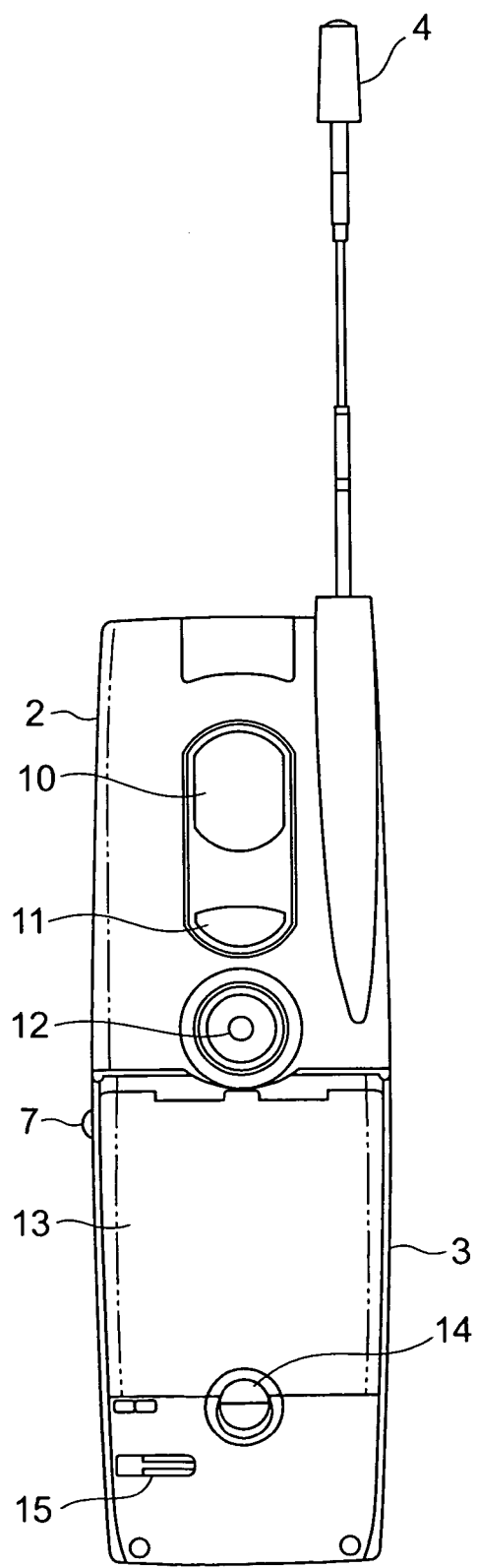

FIGS. 8A and 8B are a front view and a back view showing the outer appearance of a portable telephone 1 (opened). In the diagrams, the portable telephone 1 mainly comprises a lid portion 2 and a body portion 3. The lid portion 2 is foldable on the body portion 3. An antenna 4 is provided at the back of the lid portion 2 and is extendible and retractable. The body portion 3 has, at its one side, a slot (not shown) for a memory card as a detachable recording medium.

A speaker 5 is provided on the front side of the lid portion 2 to output voices. A display section 6 is a color liquid crystal display and displays a through image when transition to a camera mode with the portable telephone 1 open is detected. In reproduction mode, the display section 6 displays a picked-up image, an image recorded in the memory card or the like. A shutter key 7 is provided on one side of the body portion 3 and instructs image pickup by a pickup lens 12 to be discussed later in camera mode when depressed by a user. A key input section 8 is provided at the front side of the body portion 3 and includes various function keys and ten keys. A microphone 9 is provided at the lower portion of the body portion 3 to input voices.

A sub display section 10 is provided at the back of the lid portion 2. The display surface of the sub display section 10 is arranged nearly orthogonal to the optical axis of the pickup lens 12. The sub display section 10 normally displays a standby screen. When transition to the camera mode is detected, the sub display section 10, like the display section 6, displays a through image. A back key 11 is made of a transparent or semitransparent material and has a built-in LED (Light Emitting Diode) which emits light when receiving a call. The pickup lens 12 is provided at the lower portion of the sub display section 10. A battery pack 13 is provided at the back of the body portion 3 in a detachable manner and is secured by a lock section 14. The lock section 14 fixes the battery pack 13 to the body portion 3. An informing speaker 15, which informs an incoming call or so, is disposed at the back of the body portion 3 in such a way that an indicator sound can be heard with the lid portion 2 folded over the body portion 3.

FIG. 9 is a block diagram showing the structure of the portable telephone 1 according to the embodiment. A wireless transmission and reception section 16 (data transmission and reception section) wirelessly transmits and receives voices and data via the antenna 4 and modulates or demodulates the voices and data. A radio signal processing section 17 performs a process necessary for wire communication, such as demodulation of voices or data received by the wireless transmission and reception section 16 or modulation of voices or data to be transmitted from the wireless transmission and reception section 16. A control section 18 (image extracting section 181, an image zooming section 182 and a moving image generating section 183) controls various operations of the lid portion 2 and the body portion 3 and the general operation of the portable telephone 1.

A detection section 19 detects an operation of the shutter key 7. An open/close detection section 20 comprised of an optical sensor, a mechanical switch or so detects whether the portable telephone 1 is open (the lid portion 2 is put free of the body portion 3) or closed (the lid portion 2 is closed over the body portion 3).

A driver 21 drives the display section 6. A driver 22 drives the sub display section 10. A subscriber information memory section 23 stores profile data, such as a telephone number to ring the portable telephone 1 and ID (identity) of the operator (subscriber).

A ROM 24 (information memory section) stores various programs to control the control section 18, the extracted image information table and so forth. A RAM 25 stores various data needed for a wireless communication terminal, stores data needed for the operation of the control section 18, and temporarily stores image data picked up. A recording medium 31 (recording section) is comprised of a detachable memory card or so where image data received from the portable telephone and image data from an external device such as a personal computer are recorded in addition to the picked-up image data. A voice signal processing section 26 encodes a voice signal input from the microphone 9 or converts the voice signal to a complex signal based on the signal output from the radio signal processing section 17 and outputs the complex signal from the speaker 5.

A DSP (Digital Signal Processor) 27 encodes image data fetched to an image pickup module 28 (imaging section). The image pickup module 28 is comprised of a CCD or CMOS (Complementary Metal Oxide Semiconductor), and acquires a color image. An informing device 29 is a driver to drive the informing speaker 15, a vibrator 30 and an LED 115.

Figure 10:
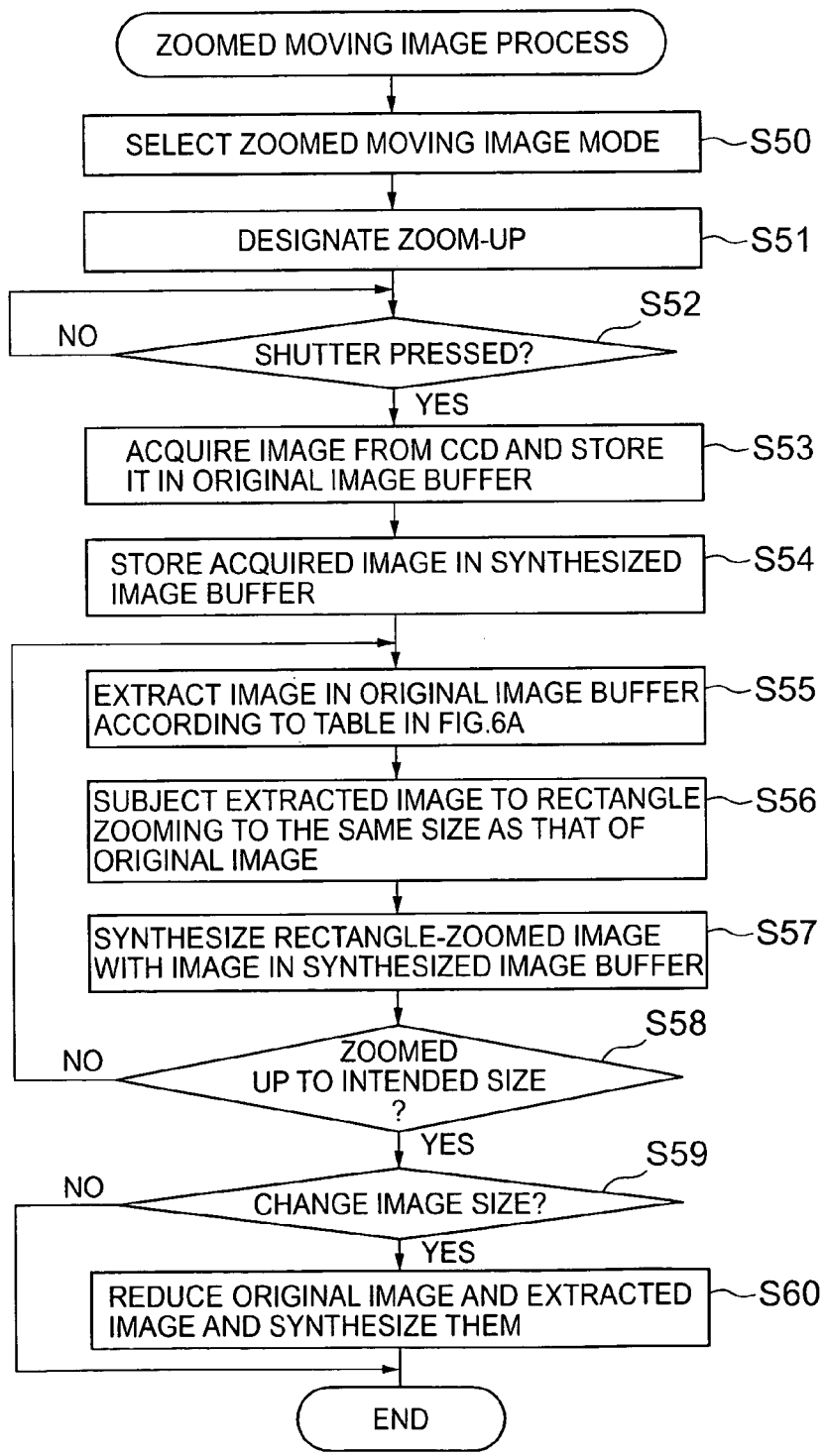
FIG. 10 is a flowchart of a zoomed moving image process according to a third embodiment of the invention.

FIG. 10 illustrates the flowchart of a zoomed moving image process. The zoomed moving image mode is selected by manipulating the key input section 8 (step S50) and the intended zoom-up size, such as ×5, ×10 or ×20, is designated first (step S51). It is determined whether the shutter key 7 has been pressed in zoomed moving image mode or not (step S52). When the shutter key 7 has been pressed to take a shot, first, the image acquired from the image pickup module 28 is encoded by the DSP 27 and is then stored in a part of the RAM 25 used as an original image buffer (step S53). When a shot is taken during the zoomed moving image process, the image acquired from the image pickup module 28 is always stored in the original image buffer. A plurality of zoomed images are generated based on those images as original images. At the same time, the acquired image is stored in a part of the RAM 25 used as a synthesized image buffer (setting of the initial image) (step S54). The synthesized image of the images of up to the previous zoom ratios is stored in the synthesized image buffer during the zoomed moving image process and every time an image of a new zoom ratio is generated, the image is synthesized with the image in the synthesized image buffer. When setting of the initial image is finished in the synthesized image buffer, an image is extracted from the image in the synthesized image buffer according to the table explained referring to FIG. 6A (step S55). The extracted image is zoomed to the same size as the size of the original image by executing the rectangle zooming process (step S56). The image subjected to rectangle zooming is synthesized with the image in the synthesized image buffer and the resultant image is stored again in the synthesized image buffer (step S57). The process starting at step S56 is repeated until zoom-up to the intended size is completed (step S58). When zoom-up to the intended size is completed, it is determined whether or not the size of the image should be changed (step S59). If there is no instruction to change the image size, the image is saved as a zoomed moving image in the recording medium 31. When alteration of the image size is instructed by a key operation on the key input section 8, the original image and the extracted image are reduced to an image size for the portable telephone (132×176), their synthesized image is generated (step S60) and the synthesized image is saved as a zoomed moving image in the recording medium 31.

According to the invention, as described above, a plurality of rectangles whose sizes continuously change are extracted from a single picked-up original image, and the extracted rectangles are zoomed to the same size as the size of the original image and are synthesized to acquire a moving image, so that a moving image equivalent to a moving image picked up by using the optical zoom or electronic zoom in moving image pickup can be acquired easily. This embodiment can permit a portable telephone which does not have a moving image pickup function or a zoom function to acquire a zoomed moving image. Further, a single shot should be taken normally so that a zoomed moving image is obtained without in less time than is need for the ordinary moving image pickup.

As a synthesized image is created by reducing the image size to the one for a portable telephone, the amount of data of a zoomed moving image can be reduced. Although a portable telephone cannot send a file having a large amount of data, a zoomed moving image can be appended to an e-mail and sent if the zoomed moving image is created by reducing a large amount of image data and synthesizing it. As the image size is made smaller than the size of the picked-up image, the image is prevented from being degraded and difficult to see.

Further, a created zoomed moving image may be compressed without changing the image size to reduce the data amount. The compression can allow a zoomed moving image to be sent in such a form as to be appended to an e-mail. In this case, the receiver side should expand the received zoomed moving image.

In case where a zoomed moving image created by changing the image size or a compressed zoomed moving image is appended to an e-mail and sent in that form, a playback command to automatically play back the zoomed moving image may be append to the e-mail. Accordingly, upon reception of the e-mail on the receiver side, the zoomed moving image is played back automatically. The receiver can avoid a work of opening the appended file and playing it back and can thus see the transmitted zoomed moving image soon.

While a zoomed moving image is created before transmission, the zoomed moving image may be generated on the receiver side. In this case, the program for the zoomed moving image process should be stored on the receiver side too. The sender appends a single image to be an original image and a generation command to activate the zoomed moving image process is appended to an e-mail and sent in that form. Because the single image to be sent has an image size for a portable telephone, it is unnecessary to change the image size on the receiver side. On the receiver side, the program for the zoomed moving image process is automatically activated by the generation command to generate a zoomed moving image with the single image sent as the original image. The zoomed moving image process at this time is the same as the flowchart from step S50 to S58 in FIG. 10. As the receiver can automatically, quickly and easily generate a zoomed moving image from the received e-mail without demanding a too much trouble on the user.

A zoomed moving image created in the above-described manner may be displayed on the sub display section 10 or the key input section 8 of the portable telephone 1 upon reception of, for example, a telephone call or an e-mail. This structure can allow a user to inform an incoming call or so by a sound and image.

Of course, the zoomed moving image process may be executed with a through image before depression of the shutter key 7 used as an original image as per the second embodiment. It is needless to say that an image to be subjected to the zoomed moving image process is not limited to a picked-up image but every image recorded on the recording medium 31 can be subjected to the zoomed moving image process.

The invention is not to be limited to the above-described embodiments, but may be modified in various forms without departing from the scope of the appended claims.

Further, the embodiments include various stages of subject matters of the invention so that a plurality of constituting elements disclosed herein, if combined adequately, can bring about various subject matters of the invention. For example, in case where even if some of all the constituting elements of each embodiment are omitted, at least one of the problems which are discussed in the BACKGROUND OF THE INVENTION and are to be overcome by the invention can be overcome and at least one of the advantages discussed in the SUMMARY OF THE INVENTION is obtained, the structure without the omitted constituting elements can be derived as one mode of the invention.

Various embodiments and changes may be made thereunto without departing from the broad spirit and scope of the invention. The above-described embodiment is intended to illustrate the present intention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application Nos. 2003-69695 filed on Mar. 14, 2003 and 2004-3781 filed on Jan. 9, 2004, and including specification, claims, drawings and summary. The disclosure of the above Japanese applications is incorporate herein by reference in its entirety.

What is claimed is:

1. An image synthesizing apparatus comprising:
    an image extracting section which extracts plural images of different sizes from a single image as an original image;
    an image zooming section which zooms up said plural images of different sizes extracted by said image extracting section to a same size as a size of said original image; and
    a moving image generating section which synthesizes said plural images zoomed up by said image zooming section to generate a moving image.

2. The image synthesizing apparatus according to claim 1, further comprising:
    an imaging section which images a subject to be imaged;
    a recording section which records an image of said subject imaged by said imaging section as image data; and
    an information memory section where information on extraction sizes is stored.

3. The image synthesizing apparatus according to claim 2, further comprising:
    a data transmission- and reception section which wirelessly transmits and receives voices and data; and
    a display section which displays said image of said subject imaged by said imaging section.

4. The image synthesizing apparatus according to claim 1, wherein said image zooming section performs image zooming based on a rectangle zooming algorithm, and selects one pixel from pixels constituting an image before zooming and copies a value of that pixel.

5. The image synthesizing apparatus according to claim 2, wherein said original image is an image before imaging is done by said imaging section.

6. The image synthesizing apparatus according to claim 1, wherein said image extracting section can arbitrarily set a center position of an image to be extracted from said original image.

7. The image synthesizing apparatus according to claim 1, wherein said moving image generating section generates a moving image by changing sizes of plural images to be synthesized.

8. The image synthesizing apparatus according to claim 1, wherein said moving image generating section reduces an amount of data by compressing a generated moving image.

9. The image synthesizing apparatus according to claim 1, wherein said image synthesizing apparatus is an imaging apparatus or a portable telephone terminal.

10. An image synthesizing method comprising:
    an image extracting step which extracts plural images of different sizes from a single image as an original image;
    an image zooming step which zooms up said plural images of different sizes extracted in said image extracting step to a same size as a size of said original image; and
    a moving image generating step which synthesizes said plural images zoomed up in said image zooming step to generate a moving image.

11. The image synthesizing method according to claim 10, wherein said image extracting step can arbitrarily set a center position of an image to be extracted from said original image.

12. The image synthesizing method according to claim 10, wherein said moving image generating step generates a moving image by changing sizes of plural images to be synthesized.

13. The image synthesizing method according to claim 10, wherein said moving image generating step reduces an amount of data by compressing a generated moving image.

14. A computer readable recording medium having recorded a program for allowing a computer to execute:
    an image extracting step which extracts plural images of different sizes from a single image as an original image;
    an image zooming step which zooms up said plural images of different sizes extracted in said image extracting step to a same size as a size of said original image; and
    a moving image generating step which synthesizes said plural images zoomed up in said image zooming step to generate a moving image.

15. The recording medium according to claim 14, wherein said image extracting step can arbitrarily set a center position of an image to be extracted from said original image.

16. The recording medium according to claim 14, wherein said moving image generating step generates a moving image by changing sizes of plural images to be synthesized.

17. The recording medium according to claim 14, wherein said moving image generating step reduces an amount of data by compressing a generated moving image.

* * * * *